United States Patent
Jabusch

(10) Patent No.: US 8,473,162 B2
(45) Date of Patent: Jun. 25, 2013

(54) FORCE LIMITING UNIT FOR A MOTOR VEHICLE

(75) Inventor: Ronald Jabusch, Elmshorn (DE)

(73) Assignee: Autoliv Development AB, Vargarda (SE)

( * ) Notice: Subject to any disclaimer, the term of this patent is extended or adjusted under 35 U.S.C. 154(b) by 1165 days.

(21) Appl. No.: 11/911,275

(22) PCT Filed: Dec. 15, 2005

(86) PCT No.: PCT/EP2005/013482
§ 371 (c)(1),
(2), (4) Date: Apr. 30, 2008

(87) PCT Pub. No.: WO2006/108451
PCT Pub. Date: Oct. 19, 2006

(65) Prior Publication Data
US 2009/0222171 A1    Sep. 3, 2009

(30) Foreign Application Priority Data

Apr. 12, 2005  (DE) .......................... 10 2005 016 822

(51) Int. Cl.
*B60R 22/00* (2006.01)
(52) U.S. Cl.
USPC ........ 701/45; 242/379.1; 242/382; 242/384.2
(58) Field of Classification Search
USPC ............ 242/379.1, 379.2, 382, 384.2; 701/45
See application file for complete search history.

(56) References Cited

U.S. PATENT DOCUMENTS

| 4,206,887 | A |   | 6/1980  | deRosa |              |
|-----------|---|---|---------|--------|--------------|
| 4,483,494 | A | * | 11/1984 | Takada | ........... 242/372 |
| 4,943,011 | A | * | 7/1990  | Kitamura et al. | ............. 242/372 |
| 5,297,752 | A | * | 3/1994  | Brown et al. | ............... 242/375.3 |
| 5,601,251 | A | * | 2/1997  | Hishon et al. | ............... 242/382.2 |
| 5,636,806 | A | * | 6/1997  | Sayles | ........................ 242/379.1 |
| 5,769,345 | A | * | 6/1998  | Morner et al. | ............. 242/375.3 |
| 6,260,782 | B1 | * | 7/2001 | Smithson et al. | ........... 242/379.1 |
| 6,871,813 | B2 | * | 3/2005 | Bae | ............................. 242/379.1 |

FOREIGN PATENT DOCUMENTS

EP        1222 097        7/2002

\* cited by examiner

*Primary Examiner* — Toan To
(74) *Attorney, Agent, or Firm* — Brinks Hofer Gilson & Lione

(57) ABSTRACT

In at least one embodiment of the present invention, a force limiting device for a motor vehicle is provided. The force limiting device is adopted for adjusting the absorption of a force between two parts moving relative to one another during a dangerous situation in the motor vehicle. The force limiting device comprises a kinematic energy absorption device configured such that for a predefined profile of a speed difference between the two parts moving relative to one another different force limiting levels are produced as a function of mass and momentum of the two moving parts.

43 Claims, 10 Drawing Sheets

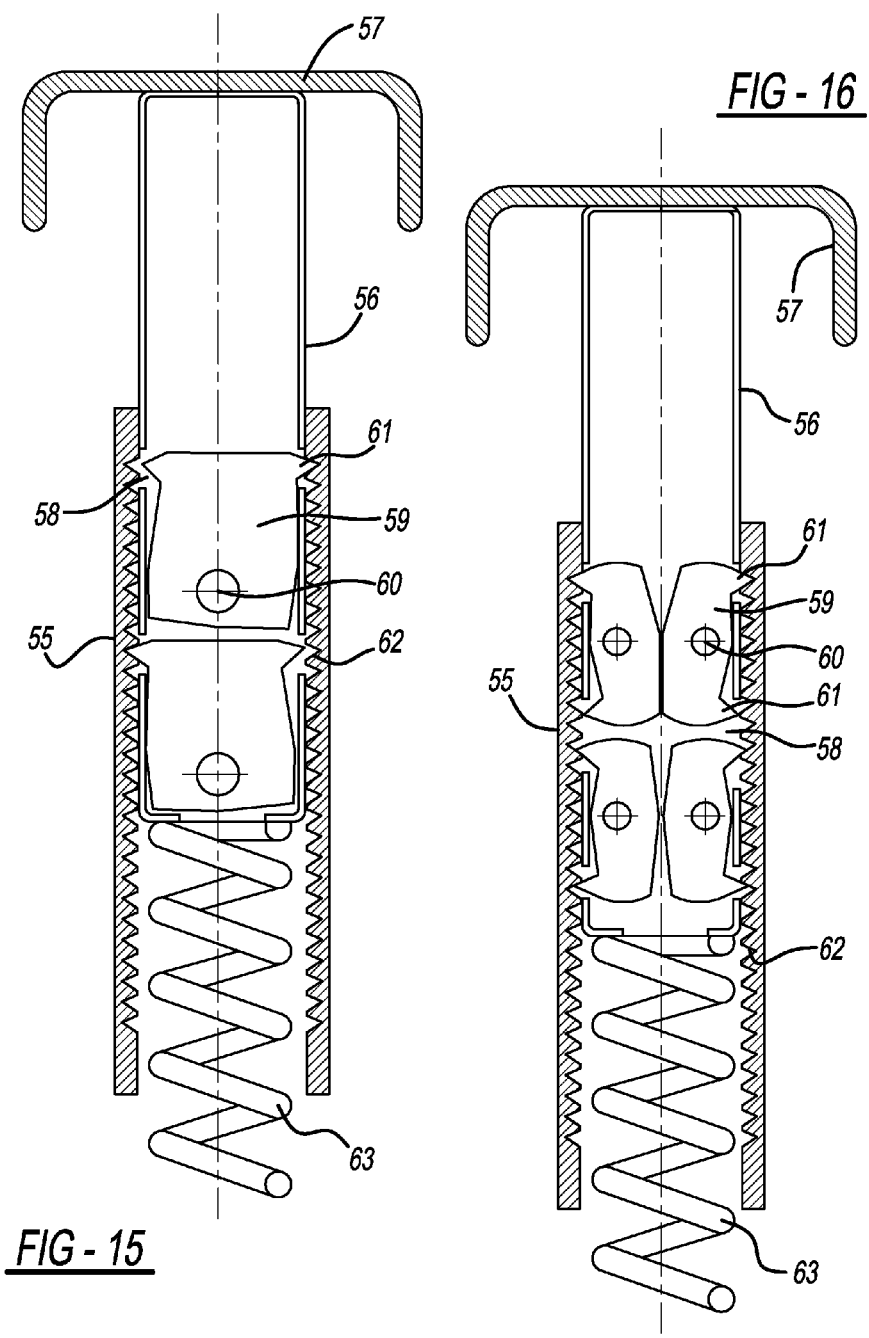

FORCE LIMITING UNIT FOR A MOTOR VEHICLE

CROSS REFERENCE TO RELATED APPLICATIONS

This application claims priority to PCT patent application WO 2006/108451 filed Dec. 15, 2005 and DE patent application 10 2005 016 822.1 filed Apr. 12, 2005.

FIELD OF THE INVENTION

The present invention relates to a force limiting device for use in a motor vehicle and more particularly to a force limiting device, which is designed for adjusting the absorption of a force between at least two parts moving relative to one another during a dangerous situation or dynamic condition in the motor vehicle.

BACKGROUND OF THE INVENTION

Force limiting devices are in use, especially in vehicle safety systems, and make it possible to absorb a belt withdrawal force occurring in the vehicle safety system in the event of a crash. The force limiting device enables a limited belt discharge relative to a component holding the belt. These types of force limiting devices are used both in vehicle safety systems that operate rotationally in the form of preferably self-locking seatbelt retractors and also seatbelt retractors combined with tensioners or in the form of pure tensioning devices, such as in the form of end-fitting tensioners, as well as in vehicle safety systems that operate linearly, in which the belt is held on a fitting piece, which moves linearly, by means of a piston/cylinder arrangement for example, either for tensioning or for adjusting a controlled belt discharge.

It is desirable, however, to also integrate a force limiting device at other locations in a motor vehicle in order to use relative motions, brought about by a crash, between two parts of the motor vehicle for energy dissipation, for example, between a bumper and the vehicle frame.

A force limiting device provided in a seatbelt retractor as part of a vehicle safety system is known from EP 1 222 097 B1 for example. In this case, the force limiting device consists of a torsion bar, one end of which is connected to the belt shaft and the other end of which can be fixed to the housing by means of a suitable locking device. If the seat-belted vehicle occupant is displaced forward in the event of an accident because of the vehicle acceleration or deceleration that occurs, resulting in a corresponding belt withdrawal force acting on the belt shaft, then the belt shaft can rotate by a certain amount, with the torsion bar twisting at the same time, so that a belt discharge will occur over a corresponding rotary travel of the belt shaft. The force that restrains the occupant in his/her forward movement is thereby absorbed. The known belt retractor provides for a second force limiting device in the form of an inertial mass which can be coupled to the belt shaft, the effect of the inertial mass being superimposed on the responding effect of the torsion bar. Depending on the speed at which the seat-belted person moves forward and also depending on the occupant data of the seat-belted person, the inertia of the inertial mass which has been put into rotation by the belt shaft becomes effective such that an additional energy-dissipating and/or force-limiting component becomes effective.

However, the known seatbelt retractor and its force limiting device has the disadvantage that the effect of the force limiting device depends on the occupant, particularly on the occupant's size, weight and seat position in the vehicle, as well as on the severity of the accident and thus, on the momentum conveyed to the occupant in an accident and on the resulting acceleration forces. The effect of the force limiting device therefore results in different force levels, which can be adjusted to the seat-belted occupants and controlled only at great expense in order to prevent the seatbelt system from placing too great a strain on the occupants during an accident.

SUMMARY OF THE INVENTION

It is therefore the object of the invention to design a force limiting device of the type described above in such a manner that its response and effect occur independently of the boundary conditions of an accident. When using this type of force limiting device in a vehicle safety system protecting a vehicle occupant in particular, the force limitation should furthermore be effective independently of the data pertaining to the body and seat position of the occupant.

Employing the principles of the present invention is the force limiting device comprises a kinematic energy absorption device which is designed in such a manner that, for a predefined profile of the speed difference between the parts moving relative to one another in the event of danger, different force limiting levels can be realized as a function of the mass of the moving parts and the momentum occurring in the event of danger.

At least one embodiment of the present invention frees itself from the basic concept of the known force limiting device, of controlling the force limiting device as a function of the established boundary conditions of an accident, in motor vehicle safety systems in particular, and also as a function of the belt withdrawal force emanating from the occupant. Instead, it makes use of the knowledge that the effects of the acceleration and deceleration forces occurring in an accident last for a limited time, such as for example, on the average of approximately 70 ms. The force limiting system can thus be designed according to the invention such that it will operate during this time period and that a maximum relative motion of the corresponding parts to one another is appropriately defined. The design of the force limiting device makes it possible to establish particular speeds of relative motions, such as for different vehicle designs. Since the possible relative motion of the parts to one another may be defined by the adjusted speed of their motion and the time period in which the force limiting device operates, the relative motion takes place independently of the size of the acting accelerations and forces and may be determined solely by the time period that can be structurally adjusted according to example embodiments of the invention or by the time period corresponding to the acceleration and deceleration forces that occur in the event of an accident.

If a force limiting device is used in a vehicle safety system comprising a belt spool that protects a vehicle occupant and rotates relative to a frame fixed to a vehicle, then in the event of an accident there will be a delayed deceleration of the vehicle and the occupant because of the existing elasticities, such as for example, in the seatbelt system and in the seat structures. This delayed deceleration results in a speed difference between the motion of the vehicle and the motion of the occupant. The speed difference, which may be vehicle-specific, can be determined by appropriate tests. In one aspect of the present invention, the belt spool presets a constant withdrawal speed for the belt strap, so that the speed difference between the vehicle and the occupant is thereby constantly adjusted with the result that an additional acceleration starting during the belt withdrawal cannot arise and the absolute deceleration of the occupant will correspond to the absolute deceleration of the vehicle. The force limiting unit can thus be designed accordingly so that the occupant will pass through a predefined forward displacement path in the vehicle during a crash sequence, independently of other external parameters. With the preset withdrawal speed, the impact speed of the occupant, for example onto an airbag, may also be approximately known so that inflation behavior of the airbag can thereby be adjusted. In another example, if the vehicle safety system comprises a collapsible steering column, the plunging of the steering column can be adjusted to correspond to the impact speed of the vehicle occupant, so that the vehicle occupant is strained as little as possible overall.

In an application of this type, the discharge speed defined by the frequency of the mass system placed into oscillation may be used in the event of a crash to control a limited discharge of the seat belt holding the vehicle occupant in order to adjust an absorption of the belt withdrawal force.

To this end, a first embodiment of the invention provides that a belt strap withdrawal occurring in the event of an accident provides the excitation of the mass system so that it achieves its oscillation frequency and the belt discharge is determined as a function of the time period of the acting belt withdrawal force, wherein it can be provided that mechanically interacting components can convert the belt discharge into the oscillatory excitation of the mass system. The basic principle of this example embodiment is thus based on the fact that the belt strap withdrawal starting at the beginning of the accident places the mass system into oscillation by means of the associated rotation of the belt shaft in the direction of withdrawal.

Alternatively, it can be provided for the force limiting device that an external drive, such as for example the drives existing in a clockwork, provides the excitation of the mass system so that it achieves its oscillation frequency and that the drive is triggered in the event of an accident and acts for a predefined time period. To this end, it can be provided according to an example embodiment of the invention that the external drive is configured as a prestressed spring/mass system. In this case, it may be necessary to take care that the toothing of the driven mass system is configured with the driven moving part in such a manner so as to ensure permanent engagement of the respective toothings.

If the structural design of the mass system can influence the oscillation frequency, it can be provided according to example embodiments of the invention that a constant oscillation frequency of the mass system is set over the time interval during which the mass system operates. But it may also be provided to set a degressive or a progressive oscillation frequency of the mass system so that a change of the mass of the force limitation occurring during the accident can thereby be preselected.

It can be provided that an oscillation cutoff, which takes effect at the end of the time interval and acts to immobilize the mass system, is provided to fix or limit the desired extent of the belt strap withdrawal.

In one example of the present invention, it can be provided in a self-locking belt retractor comprising a belt shaft that is mounted in a housing and holds the belt, that the mass system responding to the rotation of the belt shaft in the unwinding direction consists of a plurality of two-armed pendulum masses. The two-armed pendulum masses are distributed over the periphery of the belt shaft and are mounted in a manner that enables them to swing around a center bearing point fixed to the housing. Moreover, in both the final positions of the two-armed pendulum masses swinging movement, a tooth located at each end of the two-armed pendulum masses engages the external toothing of a toothed ring, which in the event of an accident is to be coupled to the belt shaft and rotates therewith. The engagement of the teeth with the toothed ring occurs in such manner that when the toothed ring rotates relative to the pendulum masses, the sliding of the tooth flanks of the teeth configured on the pendulum masses with the tooth flanks of the external toothing of the toothed ring generates the oscillation of the respective pendulum mass. To ensure this sliding, it is possible to choose a flat, but possibly also a round, toothing in the spirit of a sliding toothing.

To this end, it can be provided in respective alternative embodiments that two, four or even six pendulum masses are arranged opposite one another in symmetrical arrangement, the invention not being limited to a particular number of pendulum masses. To prevent an imbalance that could possibly occur when the pendulum masses rotate, it can be provided that the pendulum masses are arranged and configured in such a manner that their movements mutually compensate each other.

If it is provided according to an example embodiment of the invention that an annular spring engaging the outside periphery of the pendulum masses is provided with projections, which are configured on the annular spring and impinge those regions of the pendulum masses located above the teeth of the pendulum masses, the prestress generated by the annular spring thereby establishing a response threshold at which the pendulum masses become active, so that the mass system consisting of the pendulum masses and annular spring is made to oscillate only when a starting force emanating from the rotation of the belt shaft comprising the toothed ring is exceeded.

According to an example embodiment of the invention, it is provided that the pendulum masses are arranged to engage the toothed ring completely and to overlap one another on their outer ends. This may have the advantage that the motion of the individual pendulum masses is transmitted to one another so that the oscillation frequency is better maintained.

In other example embodiments of the invention, it is provided that one or a plurality of springs is additionally assigned to the mass system, thereby forming an oscillatory system by means of which a time control can be realized in that the spring or springs absorb the mass system or pendulum masses, respectively.

According to a first example embodiment of the invention in this respect, it is thus provided that one end of the pendulum mass is connected to an additional spring controlling the oscillation of the pendulum mass. To this end, it is provided according to one embodiment that the spring is fixed stationary on its other end.

The time control can be improved by supplementing the spring system acting on the pendulum mass with additional masses which also act in an absorbing manner. The force limiting device according to the invention can also be adapted to the different deceleration characteristics of different vehicles by means of the influence on the oscillation periods and on the oscillation frequency that is possible in this way. To this end, the spring/mass system is preferably designed in such a manner that the absorbing force acting on the pendulum mass in the case of natural resonance is always larger than the energy supplied by the movement of the moving vehicle part, such as by the rotation of the belt shaft comprising a toothed ring. Since the pendulum masses may swing at a high frequency, approximately up to 2,000 Hertz, the use of a very hard spring may be required.

It is thus provided in a first embodiment, that an additional mass is interposed in the spring between its hanging system on the pendulum mass and its stationary fastening. By the interposition of an additional mass, it is possible to adjust a change of oscillation frequency or oscillation time so that the mass system can be adapted to the vehicle deceleration characteristics of different vehicles.

In another embodiment, it can be provided that the other end of the spring is fixed to a two-armed, swivel-mounted lever, the other arm of which can be impinged by a switching cam connected to the toothed ring when the toothed ring rotates.

Alternatively, it can be provided that the other end of the spring is fixed to an arm attached to the pendulum mass and that an additional inertial mass is interposed in the spring between its hanging system on the pendulum mass and its hanging system on the arm.

According to example embodiments, it is provided to let the pendulum mass, as part of the mass system put into oscillation, be impinged by a brake element that slows down its oscillation, wherein an appropriate braking or absorption can be adjusted as a function of the seat position of the vehicle occupant. The spring/mass system is preferably designed in such a manner that, in the case of natural resonance, the braking force on the pendulum masses is larger than the supplied energy. The natural frequency will then also determine the time period of the possible belt strap discharge.

According to example embodiments of the invention, the brake element can consist of the brake shoes laterally impinging the pendulum mass or of an absorption element absorbing the oscillation of the pendulum mass, or it can be provided that the oscillation of the pendulum mass can be controlled or slowed down by a control device that operates electromechanically.

In an example embodiment of the invention, the mass system responding to the rotation of the belt shaft in the unwinding direction can also be arranged in the interior of the belt shaft, which is hollowly configured and demonstrates a hollow space. In an example embodiment provided to this end, it can be provided that at least one swing-mounted, two-armed pendulum mass, which has one tooth arranged on each of its outer ends, is arranged in the hollow space on the belt shaft, said tooth, in the two final positions of the swinging movement, engaging the external toothing of a bar element, which extends axially into the hollow space of the belt shaft and is connected in nonrotatable fashion to a profile head as part of the locking system on the belt retractor side. The engagement taking place in such a manner that the sliding of the tooth flanks of the teeth configured on the pendulum mass on the tooth flanks of the external toothing of the bar element generates the oscillation of the respective pendulum mass when the belt shaft comprising the pendulum mass rotates relative to the bar element.

In an alternative embodiment of the invention, in an application for a self-locking belt retractor comprising a belt shaft which holds the belt and is mounted in a housing, it can be provided that the mass system consists of a pendulum mass. The pendulum mass is mounted and/or fixed to the housing and has a control pin. The control pin engages a continuous control curve in the event of an accident and thereby controls the oscillation of the pendulum mass. The control curve is configured on a control wheel which, in the event of an accident, is to be coupled to the belt shaft and rotate therewith. This configuration is arranged in such a manner that the movement of the control pin in the control curve generates the oscillation of the pendulum mass when the control wheel rotates relative to the control pin and the control pin is carried by the pendulum mass.

This may have the advantage that the configuration of the control curve makes it possible to adjust the frequency and time of oscillation. Thus it can be provided according to alternative embodiments of the invention that the control curve demonstrates a uniform course with a constant oscillation frequency of the pendulum mass or an alternating course with a changing oscillation frequency of the pendulum mass. In this example embodiment it can likewise be provided that the end of the control curve demonstrates a retaining recess for the control pin to fix the pendulum mass.

It can furthermore be provided that an additional mass is coupled to the pendulum mass by a gearing so that an adaptation to the vehicle deceleration characteristics of different vehicles can again be made.

Besides use of the new operating principle for force limitation in a belt shaft as part of a vehicle safety system, the concept of the present invention also extends to applications of the operating principle at other locations in a motor vehicle. Thus, in one example embodiment of the invention, it can be provided that the parts moving relative to one another are a part tightly connected to the motor vehicle and, as a linearly moving component of the motor vehicle, the steering column that can move linearly in the event of a crash. Insofar as the steering wheel with the steering column supporting it can thus be arranged flexible, it is provided that the insertion path of the steering column is absorbed in a part fixed to the vehicle.

Alternatively, it can be provided that the parts moving relative to one another are a part tightly connected to the motor vehicle and, as a linearly moving component of the motor vehicle, a part of the vehicle frame that moves in the event of a crash. Thus in a front or rear impact, a part of the vehicle frame can be arranged displaceable relative to another part of the vehicle frame, wherein the operating principle according to the present invention can absorb the displacement movement.

Insofar as bumpers are already displaceably arranged relative to the vehicle today in order to intercept lighter impacts, an insertion movement of a bumper of this type can also be used as a moving body part in the event of a crash to perform force limitation. In this respect, it is provided in an example embodiment of the invention, that the parts moving relative to one another are a part tightly connected to the motor vehicle and, as a linearly moving component of the motor vehicle, a body part that moves in the event of a crash.

Again, in another example embodiment, the invention provides for use of the new force limiting principle in a linearly operating vehicle safety system comprising a fitting piece, which holds the belt and moves linearly relative to a component fixed to the vehicle and the motion of which enables a limited discharge of the seatbelt.

In linearly moving parts of this type, one example embodiment provides, with respect to a structural embodiment of the force limiting device, that the component that is fixed to the vehicle is configured cylindrical and that the component moving relative thereto demonstrates a tube that can move in the cylinder. The inside wall of the cylinder may be provided with a toothing and at least one pendulum mass. The pendulum mass may be mounted so that it can swing in the tube up to the limit stop on the cylinder wall and, has teeth that are configured opposite one another that engage the toothing of the cylinder in its two final positions such that when the tube moves longitudinally relative to the cylinder wall, the sliding of the tooth flanks of the teeth configured on the pendulum mass on the tooth flanks of the inner toothing of the cylinder generates the oscillation of the pendulum mass such that the motion of the tube is controlled by a feed rate defined by the frequency of the swinging movement.

To this end, it can be provided that a plurality of pendulum masses is arranged within the tube with swinging movements rotating opposite to one another.

To establish a response threshold, it can be provided that the tube in the cylinder is prestressed by a spring when in its starting position.

BRIEF DESCRIPTION OF THE DRAWINGS

The drawing reflects example embodiments of the invention which will be described below. The drawing shows:

FIG. 15 is a top view of a force limiting device with a mass system, the device arranged in a linearly operating system in accordance with at least one embodiment of the present invention;

FIG. 16 is the object of FIG. 15 in another embodiment; and

DETAILED DESCRIPTION

The basic principle considerations of the invention will be explained on the basis of the diagrams depicted.

Figure 1:
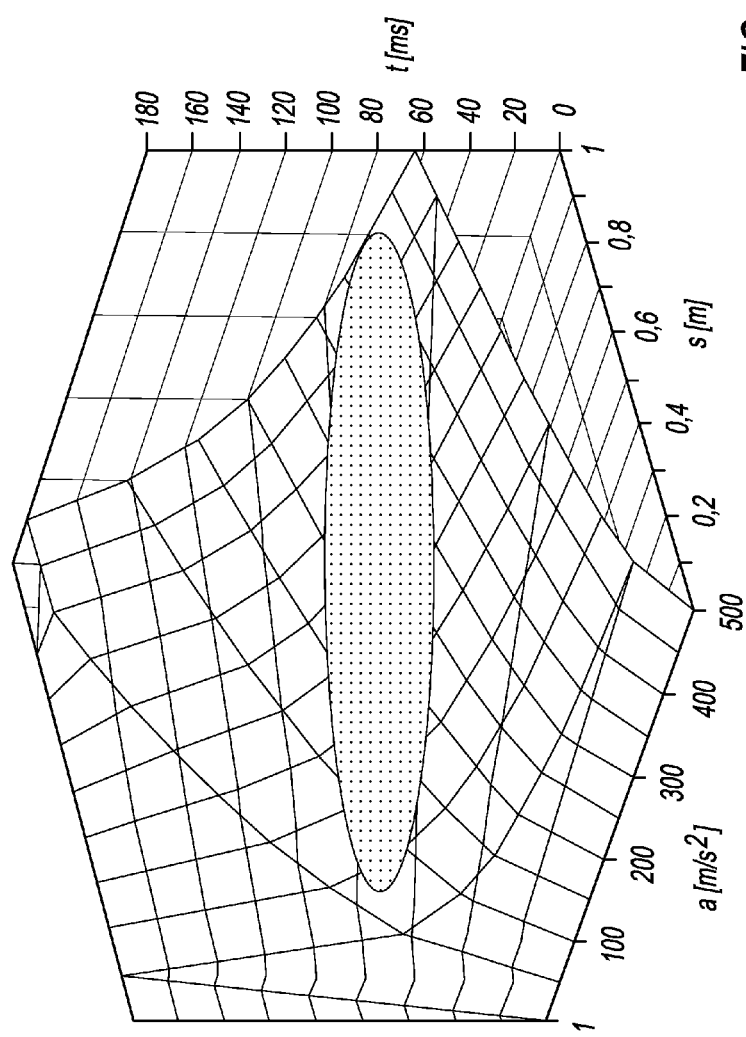
FIG. 1 is a diagram with an illustration of the interrelationship between the vehicle acceleration "a", the deformation path "s" on the vehicle and the time period of the accident "t"
Figure 2:
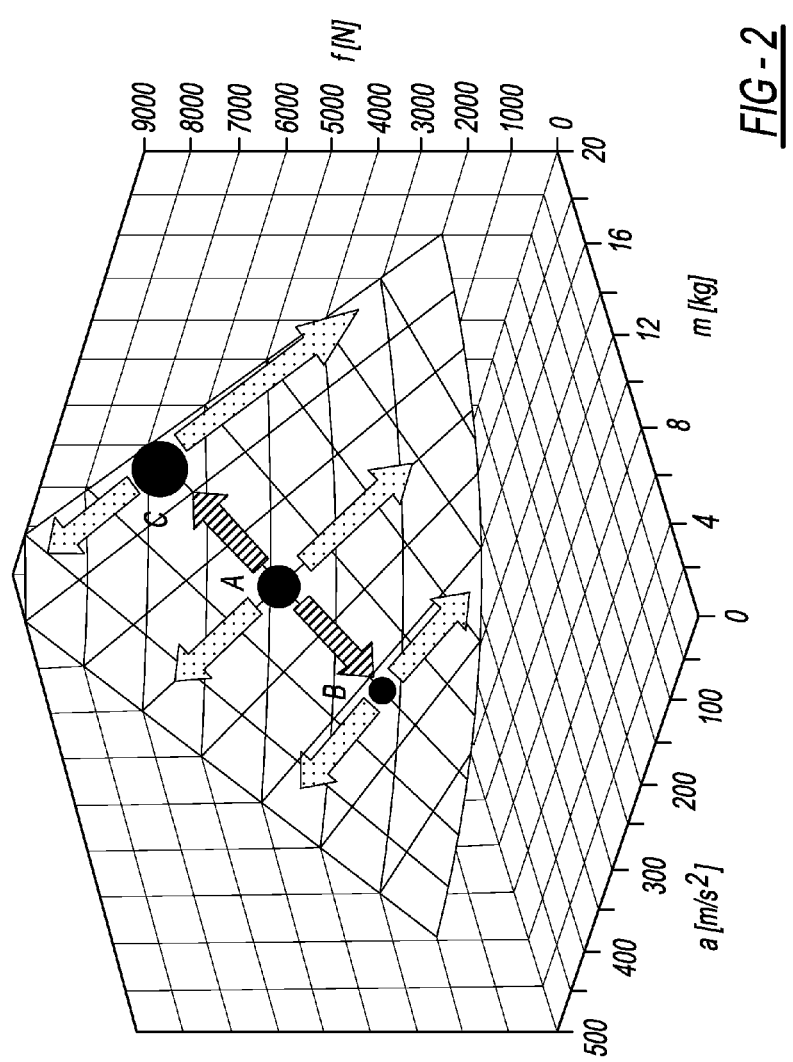
FIG. 2 is a diagram with an illustration of the interrelationship between the vehicle acceleration "a", the effective mass of the occupant "m", and the retaining force "f" appearing on the shoulder strap.

Referring to FIGS. 1 and 2, an accident takes place in a narrow time window independently of the boundary conditions of the accident, it being possible to assume the approximate average value of this time window as being within about 70 ms. In FIG. 1, the vehicle deceleration "a" is plotted vs. the deformation path "s" of the vehicle parts of interest vs. the time period (t) to an accident. Appropriate crash tests with motor vehicles show that the test results essentially lie within the dotted region, from which there results in particular the narrow time window in which the deformation of the vehicle (deformation path s) takes place as a function of the momentum, that is, the vehicle acceleration that occurs or, to be precise, the vehicle deceleration that occurs. The measuring results illustrated by the dotted area thereby confirm that the kinematics in the crash follow the basic interrelationship $t=\sqrt{2s/a}$, i.e. a harder momentum results as the deformation path increases, the crash period essentially remaining constant.

FIG. 2 depicts the interrelationship between the vehicle acceleration "a", the (chest) mass of a vehicle occupant (m), this mass acting in the vicinity of the shoulder strap, and the belt force (f) acting on the shoulder strap. Mathematically, the belt force is the product of mass×acceleration ($f=m \cdot a$). As shown, this simple mathematical relationship does not apply to belt force limiters known in the prior art because a speed difference between the motion of the motor vehicle and the motion of the vehicle occupant arises due to the delayed deceleration of the vehicle occupant relative to the vehicle, and this speed difference produces a variable additive quantity for the vehicle acceleration "A" in FIG. 2. The mathematical relation $f=m \cdot a$ is therefore not valid for this application.

Insofar as belt force limiters known in the prior art assume a fixed force value, such as 3,000 N, in the three dimensional coordinate system different combinations of accelerations (a) and masses (m) can settle only into a plane parallel to the base plane. In contrast, the stretched area in the diagram as per FIG. 2 shows the different retaining forces (f) that apply as a function of combinations of vehicle accelerations (a) and masses (m) when the invention is used. Thus, the center point A applies for a loading case of a mass of 14 kg acting on the diagonal belt and an acceleration of 350 m/s², approximately corresponding to 35 g, which gives rise to a retaining force of approximately 5,000 N. The total mass of the occupant in the loading case is distributed on the two belt strap sections and the three fastening points in the vehicle. The mass assumed in FIG. 2 represents the mass acting on the top point of the diagonal belt. Insofar as a speed difference between the vehicle and the person is avoided according to the present invention, the vehicle acceleration or deceleration remains the same for other occupants with different occupant data, so that a retaining force of around 3,500 N is established for a smaller person corresponding to point B with a mass of 10 kg at the same vehicle acceleration of 35 g. Accordingly, a correspondingly high retaining force of approximately 6,500 N applies for the occupant as per point C with a (chest) mass of 20 kg. The dotted arrows show the retaining forces that appear if the vehicle acceleration (a) drops while the (chest) mass of the vehicle occupant remains the same, the crash therefore being slighter. In this case, there is a linear decline of the retaining forces (f).

Figure 3:
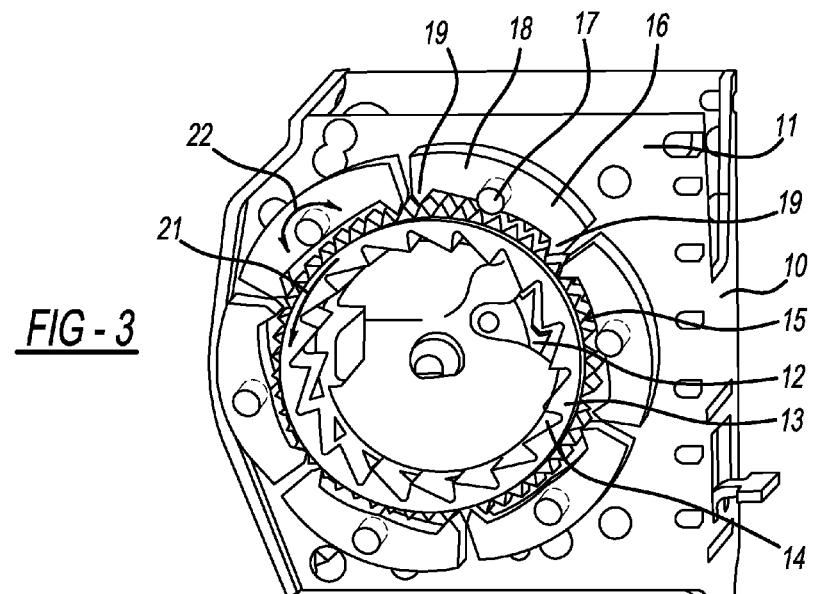
FIG. 3 is a top view of the locking side of a seatbelt retractor having a mass system according to at least one embodiment the present invention as force limiting device.

In regard to the structural example embodiment of the present invention, FIG. 3 depicts a self-locking seatbelt retractor. The seatbelt retractor demonstrates a housing 10 having a U-shaped frame 11 within which a belt shaft (not illustrated) is rotatably mounted as carrier of a belt strap wound up thereupon. On the locking side of the seatbelt retractor or housing 10, which is depicted in a top view in FIG. 3, a tooth lock washer 12, which is mounted on the belt shaft in such a manner that it can swing radially outwards, is surrounded by a toothed ring 13, which is rotatably mounted on the housing 10 and has an inner toothing 14. The toothing of the tooth lock washer 12 and the inner toothing 14 of the toothed ring 13 are configured in such a manner that the toothed ring 13 is carried along in the direction of arrow 21 when the tooth lock washer 12 engages the inner toothing 14 of the toothed ring 13 when the belt shaft rotates in the belt withdrawal direction corresponding to arrow 21.

The external side of the toothed ring 13 is provided with an external toothing 15. Moreover, six symmetrically arranged pendulum masses 16 surround and enclose the periphery of the toothed ring 13, wherein each pendulum mass 16 is mounted on the housing 10 by a centrally arranged pivot bearing 17 in such a manner that each pendulum mass 16 can carry out the swinging movement indicated by arrow 22 around its respective pivot bearing 17. To this end, the pendulum mass 16 is configured two-armed with arms 18 extending on both sides of the pivot bearing 17. A tooth 19 by means of which the respective pendulum mass engages in its two final positions, is arranged on each of the outer ends of the arms 18. To this end, the toothings of the external toothing 15 and teeth 19 of the pendulum mass 16 are configured in such a manner that, when the toothed ring 13 rotates in the direction indicated by arrow 21, the associated tooth flanks slide on one another and the rotating toothed ring 13 displaces the pendulum masses 16 into a swinging movement or holds them inside because the tooth 19 on one side of the pendulum mass engages the external toothing 15 of the toothed ring 13, while the opposite tooth 19 is disengaged from the external toothing. Moreover, when the toothed ring 13 rotates further relative to this pendulum mass, the tooth 19 of the pendulum mass 16 that is presently engaged is pushed out, thereby swinging the pendulum mass 16 in such a manner that its opposite tooth 19 is pushed into engagement with the external toothing 15 of the toothed ring 13. Upon further rotation of the toothed ring 13 relative to this pendulum mass, the movement proceeds in reverse, so that when the toothed ring 13 rotates, the swinging movement of pendulum mass 16 is maintained by the alternating engagement of its external teeth 19. At the same time, however, the alternating engagement of the teeth 19 of the pendulum mass 16 does not permit unimpaired rotation of toothed ring 13. The rotational speed of the toothed ring 13 is instead established as a function of the frequency of the swinging movement.

In the event of an accident, a belt-strap-sensor and/or vehicle-sensitive control system (not shown), which in the case of self-locking belt retractors is nevertheless adequately known, deflects the tooth lock washer 12 from engagement with the inner toothing 14 of the toothed ring 13. If the toothed ring 13 is next fixed by a shear pin (not shown) in order to establish a response threshold for the activation of the mass system, then the toothed ring 13 will rotate in the direction of arrow 21 when a certain force is exceeded. To this end, the external toothing 15 of the toothed ring 13 pushes out the teeth 19 on one side of the pendulum masses 16 arranged on its outside periphery, wherein the pendulum masses 16 again engage the external toothing 15 with the teeth 19 arranged on their other side. During this process, each of the individual pendulum masses 16 is alternately accelerated and decelerated, dissipating the energy. The stronger the acceleration forces acting on the pendulum masses, the greater the deceleration forces appearing at the same time because of their swinging movement. The toothed ring 13 and, because it is coupled by the tooth lock washer 12, therefore also the belt shaft can rotate only at that speed permitted by the pendulum masses swinging in rhythm, so that the withdrawal on the belt strap caused by the rotation of the belt shaft in the unwinding direction is determined solely by the swinging of the mass system started or initiated by the rotation of the belt shaft, and the withdrawal is therefore independent of the belt withdrawal force acting on the belt strap.

Whereas in the prior art, the extent to which the belt strap is withdrawn was essentially determined by the size of the acting and more or less twisting belt force, for example that of a torsion rod used as force limiting device. In the mass system used according to the invention, the extent to which the belt strap can be withdrawn or pulled out depends solely on the time period during which the mass system operates. If, according to experience, an accident occurrence is completed after approximately 70 ms, the mass system can be designed in such a manner that its operation will terminate after approximately this time period so that no further belt withdrawal will occur and the stationary deceleration ring will fix the belt strap to the housing. As not illustrated in detail, an oscillation cutoff, which acts at the end of the set time interval and effects a rest position of the mass system, can be provided.

In the illustrated example embodiment, the mass system comprising of the pendulum masses 16 is arranged on the housing 10 of the belt retractor. It is also possible to arrange this mass system on the associated front face of the belt shaft itself.

Figure 4:
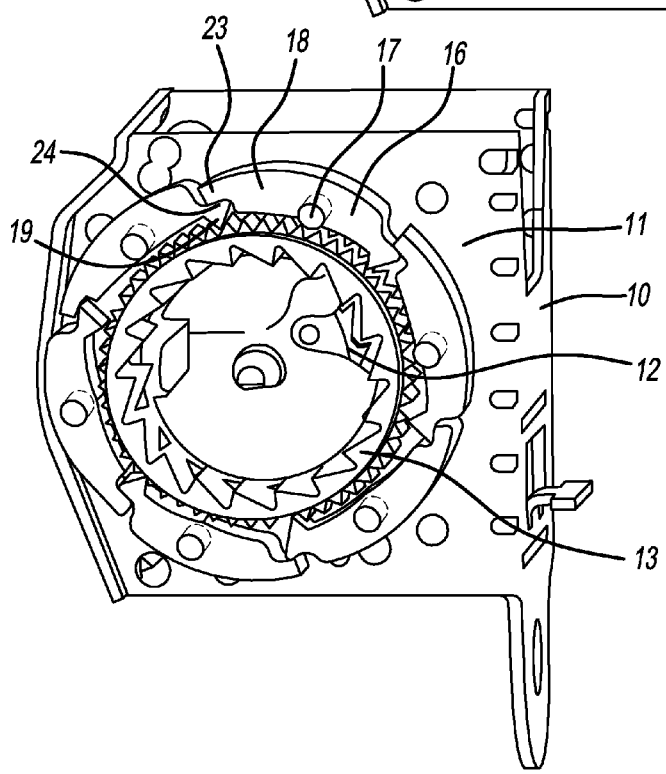
FIG. 4 is the object of FIG. 3 in another embodiment.

The example embodiment depicted in FIG. 4 differs from the previously described example embodiment in that the pendulum masses 16 distributed over the periphery of the toothing ring 13 overlap in the direction of rotation as indicated by arrow 21, in that an overlap projection 23 protruding in the direction of rotation is configured on the one pendulum mass 16 and rests on an overlap recess 24 configured on the pendulum mass 16 that is adjacent in the direction of rotation. In this manner it is possible to avoid the configuration of a tooth 19 under the overlap projection. It is thereby possible to also synchronize the swing movement of the individual pendulum masses 16.

Figure 5:
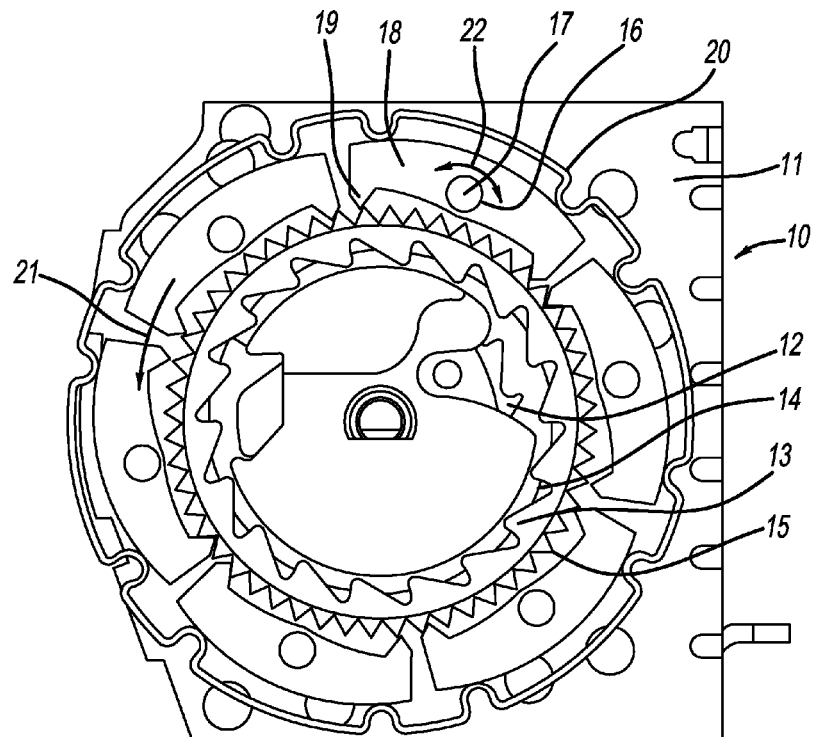
FIG. 5 is the object of FIG. 3 in another embodiment.

The example embodiment depicted in FIG. 5 corresponds to the embodiment described in FIG. 3. In place of the shear pin mentioned regarding FIG. 3, the example embodiment depicted in FIG. 5 is provided with an annular spring 20, which externally surrounds the pendulum masses and prestresses all pendulum masses uniformly. This annular spring defines a starting force that must be overcome before the mass system begins to operate. In this respect, the slight loads of the belt shaft caused by a withdrawal force acting on the belt strap underneath the response threshold defined by the annual spring 20 do not result in a rotation of the toothed ring 13 together with a movement of the pendulum masses 16 of the mass system triggered thereby. At the same time, the respective toothings and the annular spring 20 can be configured and fixed in such a manner that, at the end of the force limiting process when the mass system comes to rest, the actual locking toothed system will always come to stop in such a manner that the control elements of the self-locking belt retractor will be synchronized for the belt-strap-sensor and/or the vehicle-sensitive control system. It is thereby possible to use the force limitation function triggered by the mass system many times in succession.

Moreover when using a plurality of pendulum masses, it can be provided that these either operate synchronously or also that they move asynchronously. This will affect the extent of the force limitation in the particular case.

It can be advantageous to additionally influence the movement of the pendulum masses 16, especially in view of an intended time control. To this end, it is thus possible for spring systems or spring/mass systems or other brake or absorption elements to engage the pendulum mass 16 or pendulum masses 16 to affect the oscillation period and/or the oscillation frequency of the pendulum masses. To this end, the additional control elements can be configured in such a manner that the belt strap discharge beyond that determined by the rotation of the toothed ring 13 permitted by the pendulum masses can be adjusted variable In the simplest embodiment as per FIG. 6, there is provided a spring 25, one end of which is fixed to an arm 18 of an associated pendulum mass 16 and the other end of which is fixed to a fixed bearing 26. If it is additionally necessary to overcome the force of the spring 25 during a swinging movement of the pendulum mass 16 in one direction, this will limit the time of the swinging movement.

Figure 7:
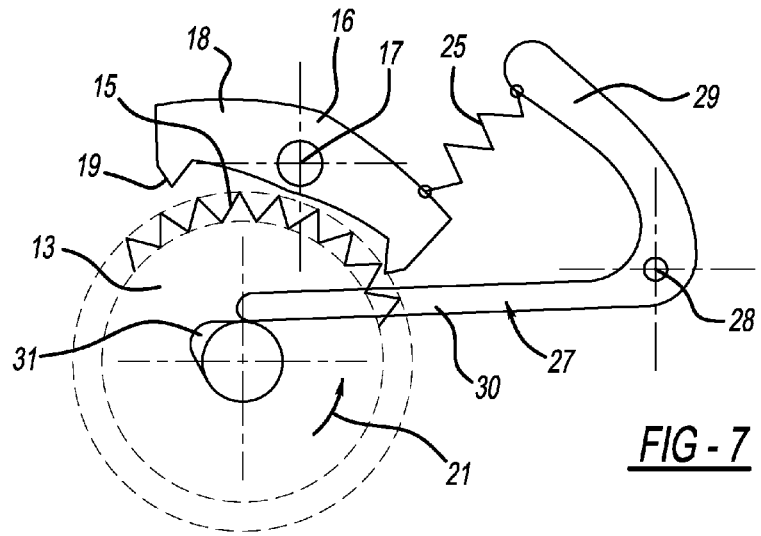
FIG. 7 is the object of FIG. 6 in another embodiment.

In the example embodiment depicted in FIG. 7, the associated end of the spring 25 is fixed to a separated lever 27, which is rotatably arranged around a fulcrum 28 fixed to the housing. The lever 27 is configured two-armed, comprising a first arm 29 as attachment point for the spring 25 and a second arm 30, wherein the second arm 30 extends into the turning range of the toothed ring 13 and here fits a lifting cog 31 configured on the toothed ring 13. When the toothed ring 13 rotates, the force of the spring 25 is changed at a predefined time as a result of the lifting cog 31 hitting the lever 27, thereby affecting the oscillation behavior of the associated pendulum mass 16.

Figure 6:
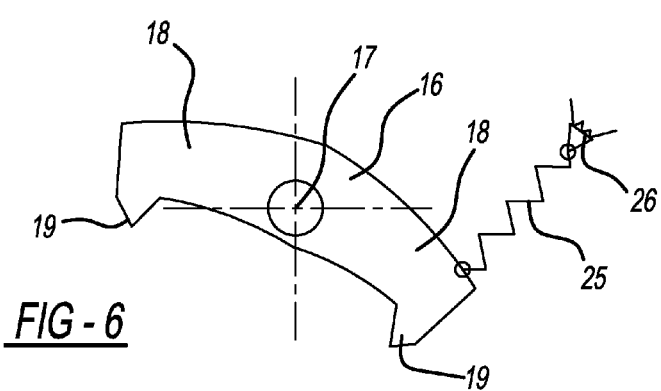
FIG. 6 is a single pendulum mass of the mass system as per FIG. 3 with an additional spring in a schematic representation.
Figure 8:
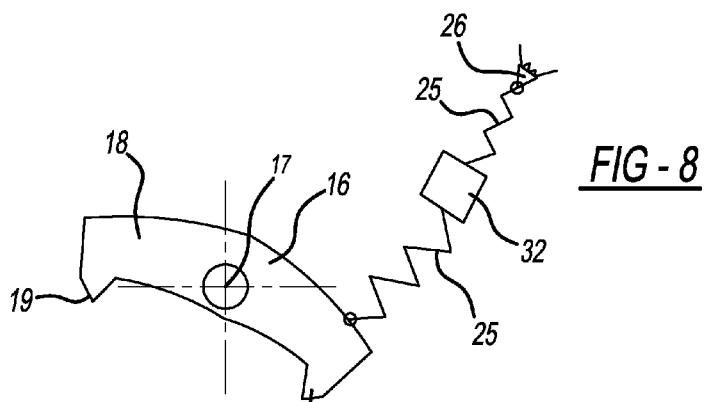
FIG. 8 is a single pendulum mass of the mass system as per FIG. 3 with an additional spring mass system in a schematic representation.
Figure 9:
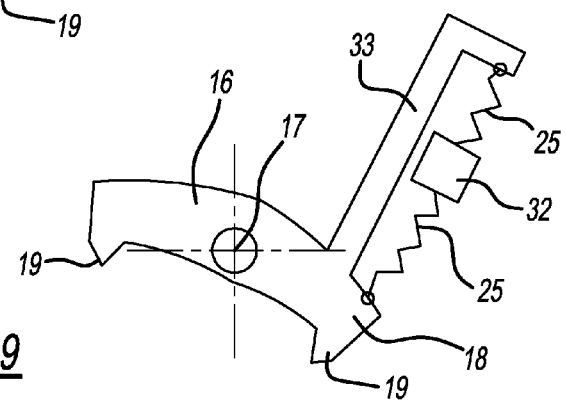
FIG. 9 is the object of FIG. 8 in another embodiment.

In the example embodiments depicted in FIGS. 8 and 9, the spring system as depicted in FIG. 6 is supplemented by an additional mass 32, so that there arises a spring/mass system which likewise affects the oscillation period of the associated pendulum mass 16. To this end in the example embodiment depicted in FIG. 8, an additional mass 32 is interposed in the spring 25, which is configured in two parts.

In the example embodiment depicted in FIG. 9, one end of the spring 25, said spring including mass 32, is fixed to the pendulum mass 16 and the other end is fixed to a retaining arm 33 located on the pendulum mass 16 itself.

Figure 10:
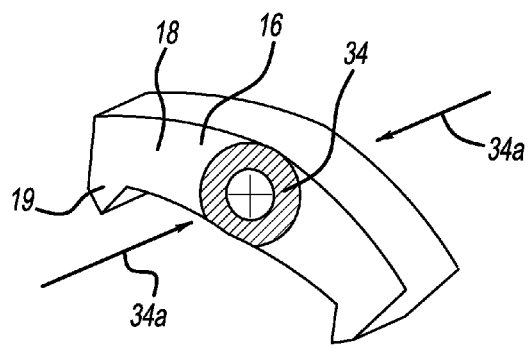
FIG. 10 is a single pendulum mass with an additional absorbing means in a schematic representation in accordance with at least one embodiment of the present invention.

Control of the swinging movement is furthermore possible if, as per FIG. 10, a brake element 34, which is indicated by crosshatching and exercises a braking force indicated by arrows 34a on the pendulum mass 16, engages the pendulum mass 16.

Figure 11:
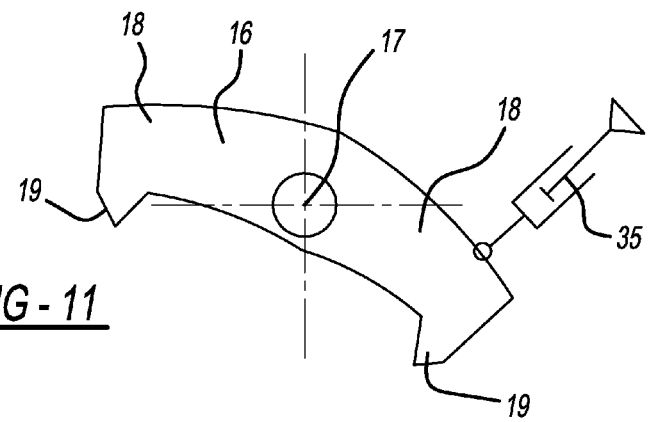
FIG. 11 is the object of FIG. 10 in another embodiment.

In the example embodiment depicted in FIG. 11, there is provided a mechanically operating absorption element 35, which can be configured as a piston/cylinder arrangement for example.

Figure 12:
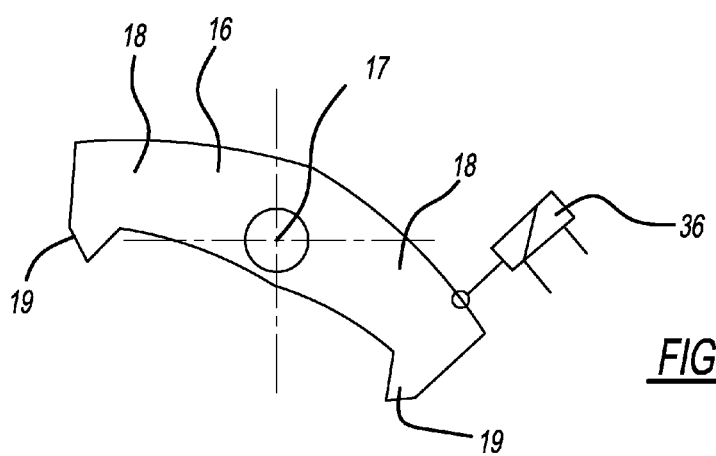
FIG. 12 is the object of FIG. 10 in another embodiment.

In the example embodiment depicted in FIG. 12, an electromechanically operating absorption element 36 is assigned to the pendulum mass 16.

Figure 13:
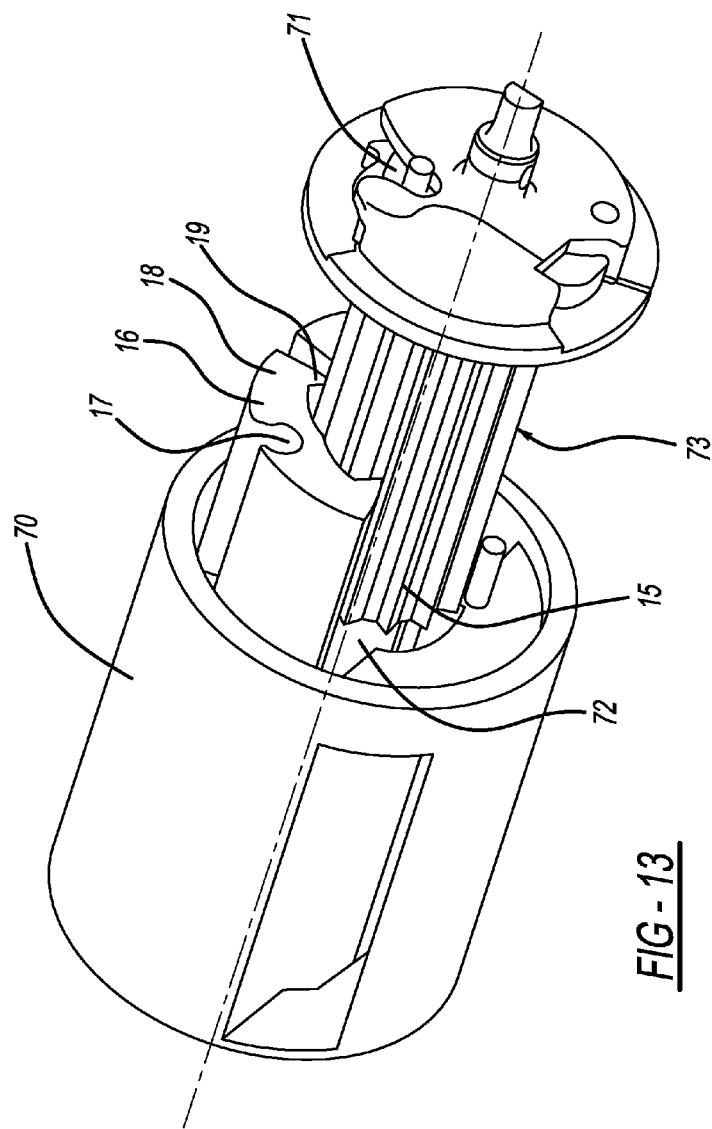
FIG. 13 is the belt shaft of a seatbelt retractor with the mass system as force limiting device arranged in its interior in accordance with at least one embodiment of the present invention.

FIG. 13 depicts the accommodation of the mass system operating as force limiting device in the interior of the belt shaft of a seatbelt retractor. To this end, the mass system is constructed like the mass system described in FIG. 3 or in FIGS. 3 to 5. Insofar as the front of the associated belt shaft 70 in a seatbelt retractor known from the prior art is connected to a profile head 71, which is to be locked fixed to the housing when triggered, in such a manner that the belt shaft 70 can rotate further relative to the locked profile head 71 for the purpose of force limitation, the belt shaft 70 is configured as a hollow body comprising an inner hollow space 72. The corresponding pendulum masses 16 include external teeth 19 which are mounted on the wall of belt shaft 70 and distributed internally over the periphery, as described in regard to FIG. 3. The associated external toothing 15 for engaging the teeth 19 of the pendulum mass 16 comprising teeth 19 is configured on a bar element 73, which is carried by the profile head 71 and extends axially into the hollow space 72 of the belt shaft 70 and is tightly connected to the profile head 71. If profile head 71 is locked when locking occurs, then the continuous belt tension on the belt strap wound up on the belt shaft 70 causes the belt shaft 70 to rotate further relative to the profile head 71 and relative to the bar element 73 tightly connected thereto, wherein the pendulum masses 16 arranged in the hollow space 72, together with their teeth 19, will slide on the external toothing 15 of the bar element 73 because of the further rotation of the belt shaft, thereby generating the swinging movement of the pendulum masses 16 used for force limitation.

It is not necessary to use the rotation of the toothed ring caused by the belt force in order to drive the pendulum mass or pendulum masses. Rather it is also possible to provide an external drive that operates like a clockwork, such as in the form of a prestressed spring/mass system, which excites or controls the movement of the pendulum masses for a predefined time period. To this end, a gearing, which can be configured either as self-locking or not self-locking, can be arranged between the pendulum mass and the external drive.

Figure 14:
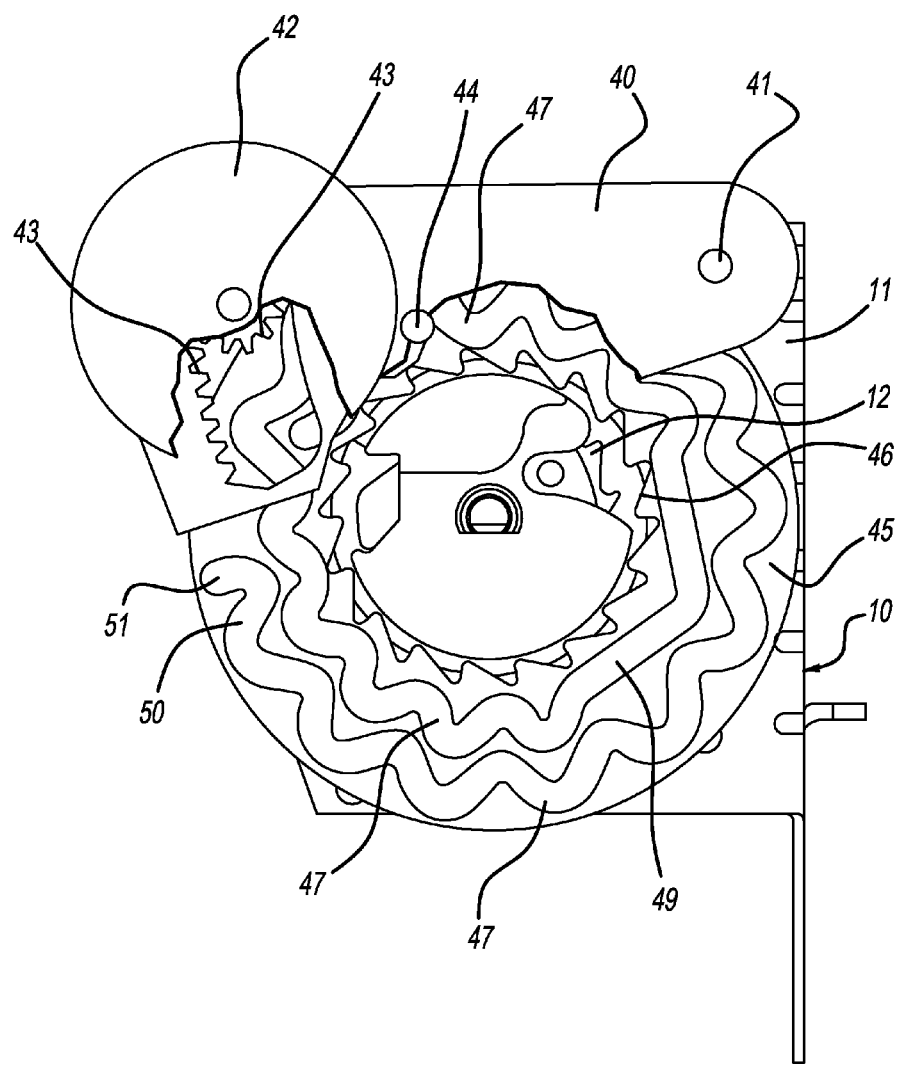
FIG. 14 is the object of FIG. 3 and FIG. 4 in another embodiment containing a control curve.

The example embodiment depicted in FIG. 14 essentially corresponds to the example embodiments depicted in FIGS. 3 and 4 but is based on a different way of initiating the rotation of the belt shaft in the swinging movement of an associated pendulum mass. In this example embodiment, only one pendulum mass 40 is arranged swinging around a fulcrum 41 fixed to a housing, wherein an additional mass 42, which is connected to the pendulum mass 40 by a gearing 43, is placed on the free end of the pendulum mass 40. The mass inertia of the pendulum mass 40 is thereby increased as a whole, taking the interposed gear 43 into consideration. The pendulum mass 40 uses a control pin 44 projecting from it to engage a control wheel 45, which is rotatably arranged on the housing 10 of the belt retractor, wherein, in like manner as the toothed ring 13, the control wheel 45 is provided with an inner toothing 46 into which the ejectable tooth lock washer 12 can be injected in such a manner that the rotation of the belt shaft in the direction of arrow 21 can be converted into a corresponding rotation of the control wheel 45.

A spiral-shaped control curve 47, which is configured in the form of a groove built into the front face of the control wheel 45 and which guides the control pin 44 of the pendulum mass 40, is provided in the control wheel 45. The predefined control curve 47 has such a course that it generates corresponding swinging movements of the pendulum mass 40 and its additional mass 42 around the fulcrum 41. To this end, section 49 of the control curve 47 is shaped noticeably flatter so that in this region the belt strap discharge will be larger over the time unit and the belt force will drop correspondingly. In the end region 50 of control curve 47, the control curve 47 again demonstrates a steeper course in order to achieve a larger deceleration and to then end in a stop recess 51, further swinging movement of the pendulum mass 40 and therefore also the possible belt strap discharge being terminated when the control pin 44 reaches it. The control curve 47, whose design can be modified, thus enables the controlled, predefined belt strap discharge to be adapted to the respective deceleration characteristic of the vehicle of interest.

Finally, FIGS. 15 and 16 depict a linearly operating system in which the relative motion of its components to one other occurring in a crash is converted into a force limitation. This may, for example, relate to a steering column which, as carrier of the steering wheel, can be pushed into a part fixed to the vehicle. In particular, in FIG. 15 there is provided a part, which is configured as cylinder 55 and fixed to the vehicle and which is provided with an inner toothing 62. A tubular steering column 56, which serves as the carrier of a steering wheel 57 and within which, in the illustrated example embodiment, two pendulum masses 59 are arranged so that they can rotate around fixed fulcrums 60, is guided in the cylinder 55 in a displaceable manner. The steering column 56 demonstrates passages 58, which are opposite one another and which the teeth 61 arranged on the pendulum masses 59 can pass through during the respective swinging movements of the pendulum mass 59 until they engage the inner toothing 62 of the cylinder 55. The sequence of motion takes place as described with respect to FIG. 3, in that, when the steering column 56 is inserted into the cylinder 55, the teeth 61 of pendulum masses 59 slide off the inner toothing 62 on one side of the cylinder 55 and become free and, at the same time, come into engagement with the inner toothing 62 of the cylinder 55 on the opposite side because of their swinging movement. Another spring 63, which defines the starting force to be overcome and simultaneously can also provide for a resetting of the steering column 56 when the force limitation process has terminated, is arranged in the cylinder 55 to support the insertion movement, as basically also described in regard to the example embodiments as per FIGS. 3 and 5.

The example embodiment depicted in FIG. 16 basically represents the same relationships wherein, in place of the two pendulum masses 59 depicted in FIG. 15, there are now provided four pendulum masses 59, which extend in the longitudinal direction of steering column 56 and are correspondingly configured two-armed with teeth 61 arranged on each arm. In this respect, the operation described with respect to FIG. 1 for the pendulum masses 16 corresponds to the example embodiment in FIG. 16.

Moreover, this type of arrangement can also be applied to a linearly operating seatbelt system in which, for example, a fitting piece as carrier of a seatbelt can be inserted in the cylinder 55 in place of the steering column 56. In the same manner, it can be provided that the relative motions of a mobile vehicle part, such as a bumper or part of a vehicle side member, can be provided in the cylinder 55 as the part fixed to the vehicle.

Figure 17:
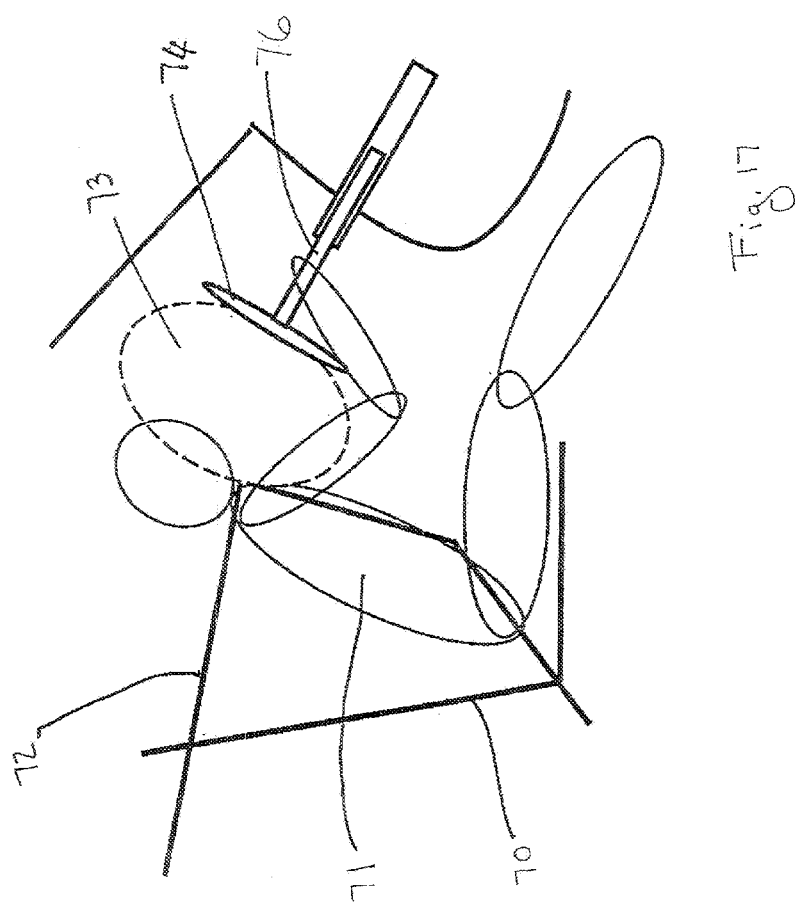
FIG. 17 is the interaction of the force limiting device with a vehicle safety system for a vehicle occupant in a schematic representation in accordance with at least one embodiment of the present invention.

The interaction of a time-controlled and speed-controlled belt discharge as per the example embodiment explained above can be explained once more on the basis of FIG. 17. It depicts a vehicle occupant 71 seated on a seat 70 at the end of the forward displacement enabled by the controlled discharge of the belt strap 72, in which the head of the occupant 71 strikes an inflating airbag 73. To this end, the airbag 73 has unfolded itself out of a steering wheel 74, which is seated on a steering column 76 that is configured as insertable.

Since a belt retractor (not illustrated) predefines the speed of the discharge of belt strap 72, the inflation rate or ventilation rate of the airbag 73 and also the insertion rate of steering column 76 can be appropriately adjusted, wherein the sum of the speed relative to the airbag and the speed relative to the steering column should correspond to the rate of seatbelt discharge. This type of configuration produces the least possible strain on the vehicle occupant 71 as a whole.

As a person skilled in the art will appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A force limiting device for a motor vehicle adapted for adjusting the absorption of a force between a first part and a second part moving relative to one another during a dynamic condition in the motor vehicle, the force limiting device comprising a kinematic energy absorption device configured such that for a predefined profile of a speed difference between the first part and the second part moving relative to one another force limiting levels are produced by the force limiting device, the kinematic energy absorption device including a mass system which is placed into oscillation during the dynamic condition at a frequency that provides a restraining force acting between the first part and the second part, thereby affecting the speed difference between the first part and the second part relative to one another.

2. The force limiting device according to claim 1, wherein the mass system is placed into the oscillation with a predefined influence on the frequency.

3. The force limiting device according to claim 1, wherein the two moving parts are components of a vehicle safety system, which during the dynamic condition controls a limited extraction of a belt holding a seat-belted occupant at a extraction rate defined by the frequency of the oscillation of the mass system, and comprises a belt spool forming the first part and a frame forming the second part, wherein the belt spool rotates relative to the frame that is fixed to the motor vehicle.

4. The force limiting device according to claim 3, wherein the belt extracted during the dynamic condition provides excitation of the mass system such that the mass system achieves the frequency of the oscillation, and the belt extracted is a function of a time period of a withdrawal force of the belt.

5. The force limiting device according to claim 4, wherein mechanically interacting components convert the belt being extracted into the excitation of the mass system.

6. The force limiting device according to claim 3, wherein an external drive provides the excitation of the mass system such that the frequency of the oscillation is achieved and the external drive is triggered during the dynamic condition and acts for a predefined time period.

7. The force limiting device according to claim 6, wherein the external drive is configured as a pretensioned spring-mass system.

8. The force limiting device according to claim 2, wherein a constant oscillation frequency of the mass system is maintained over a time interval.

9. The force limiting device according to claim 2, wherein the influence on the frequency decreases the frequency of the mass system over a time interval.

10. The force limiting device according to claim 2, wherein the influence on the frequency increases the frequency of the mass system over a time interval.

11. The force limiting device according to claim 1, wherein an oscillation cutoff, which takes effect at the end of a time interval and acts to immobilize the mass system, is provided.

12. The force limiting device according to claim 3, wherein the vehicle safety system includes a self-locking belt retractor comprising a belt shaft which is mounted in a housing and holds the belt, and wherein the mass system responds to rotation of the belt shaft in the unwinding direction, and includes of a plurality of two-armed pendulum masses which are disposed over a periphery of the belt shaft and which are mounted so that each of the two-armed pendulum masses swings between two end positions around a center bearing point fixed to the housing and which, in each of the two end positions of their swinging movement, engage one of two teeth located at opposite ends to engage with toothing of a toothed ring, which during the dynamic condition is to be coupled to the belt shaft and rotate therewith, the teeth engaging the toothing such that when the toothed ring rotates relative to the two-armed pendulum masses, sliding of tooth flanks of the two teeth configured on the pendulum masses with tooth flanks of the toothing of the toothed ring generates the oscillation of the respective two-armed pendulum mass.

13. The force limiting device according to claim 12, wherein two of the two-armed pendulum masses are arranged opposite one another in symmetrical arrangement.

14. The force limiting device according to claim 12, wherein the two-armed pendulum masses are arranged opposite one another in symmetrical arrangement.

15. The force limiting device according to claim 12, wherein six of the two-armed pendulum masses are arranged opposite one another in symmetrical arrangement.

16. The force limiting device according to claim 12, wherein the two-armed pendulum masses are arranged and configured such that their movements mutually compensate each other.

17. The force limiting device according to claim 12, wherein an annular spring engaging the outside periphery of the two-armed pendulum masses is provided with projections, which are configured on the annular spring and impinge regions of the two-armed pendulum masses located above the teeth of the two-armed pendulum masses.

18. The force limiting device according to claim 12, wherein the two-armed pendulum masses are arranged to engage the toothed ring completely and to overlap one another on their outer ends.

19. The force limiting device according to claim 12, wherein one end of the two-armed pendulum mass is connected to a spring controlling the oscillation of the pendulum mass.

20. The force limiting device according to claim 19, wherein the spring is fixed stationary at one end.

21. The force limiting device according to claim 20, wherein an additional mass is interposed in the spring between its end connected to the two-armed pendulum mass and its end that is fixed stationary.

22. The force limiting device according to claim 19, wherein another end of the spring is fixed to one arm of a two-armed, swivel-mounted lever, and the other arm of which is configured to be impinged by a switching cam connected to the toothed ring when the toothed ring rotates.

23. The force limiting device according to claim 19, wherein the other end of the spring is fixed to an arm attached to the two-armed pendulum mass and that an additional inertial mass is interposed in the spring between its end connected to the two-armed pendulum mass and its end fixed to the arm.

24. The force limiting device according to claim 12, wherein the two-armed pendulum mass is impinged by a brake element that slows down the oscillation of the two-armed pendulum mass.

25. The force limiting device according to claim 24, wherein the brake element includes brake shoes that laterally impinging the two-armed pendulum mass.

26. The force limiting device according to claim 12, wherein the two-armed pendulum mass is impinged by an absorption element absorbing the oscillation of the two-armed pendulum mass.

27. The force limiting device according to claim 26, wherein the absorption element includes a hydraulically operating piston/cylinder system.

28. The force limiting device according to claim 12, wherein the oscillation of the two-armed pendulum mass is controlled by a control device that operates electromechanically.

29. The force limiting device according to claim 3, wherein the vehicle safety system includes a self-locking belt retractor comprising a belt shaft that is mounted in a housing and holds the belt, and wherein the mass system responds to rotation of the belt shaft in the unwinding direction and is disposed in an interior of the belt shaft, the belt shaft defining the interior as having a hollow space.

30. The force limiting device according to claim 29, wherein the mass system includes at least one two-armed pendulum mass which is mounted to swing between two end positions and which has one tooth arranged on each of its outer ends, the two-armed pendulum mass is arranged in the hollow space of the belt shaft, the tooth, in the two end positions of the swinging movement of the two-armed pendulum mass, engaging toothing of a bar element, which extends axially into the hollow space of the belt shaft and is connected in nonrotatable fashion to a profile head as part of a locking system on a belt retractor side, the engagement taking place in such a manner that sliding of tooth flanks of the teeth configured on the pendulum mass with tooth flanks of the toothing of the bar element generates the oscillation of the two-armed pendulum mass when the belt shaft rotates relative to the bar element.

31. The force limiting device according to claim 3, wherein the vehicle safety system includes a self-locking belt retractor comprising a belt shaft that is mounted in a housing and holds the belt, wherein the mass system includes a pendulum mass, which is mounted fixed to the housing and has a control pin, the control pin engaging a continuous control curve during the dynamic condition so as to control the oscillation of the pendulum mass, and that the control curve is formed on a control wheel which, during the dynamic condition, is to be coupled to the belt shaft and rotate therewith such that movement of the control pin in the control curve generates the oscillation of the pendulum mass when the control wheel rotates relative to the control pin, the control pin being carried by the pendulum mass.

32. The force limiting device according to claim 31, wherein the control curve has a uniform course with a constant oscillation frequency of the pendulum mass.

33. The force limiting device according to claim 31, wherein the control curve has an alternating course with a changing oscillation frequency of the pendulum mass.

34. The force limiting device according to claim 31, wherein an end of the control curve has a stop recess for the control pin to fix the pendulum mass.

35. The force limiting device according to claim 31, wherein an additional mass is coupled to the pendulum mass by a gearing.

36. The force limiting device according to claim 1, wherein the first part is fixedly connected to the motor vehicle and the second part is a steering column that can move linearly relative to the first part during the dynamic condition.

37. The force limiting device according to claim 1, wherein the first part is fixedly connected to the motor vehicle and the second part, is a portion of a vehicle frame that moves linearly relative to the first part during the dynamic condition.

38. The force limiting device according to claim 1, wherein the first part is fixedly connected to the motor vehicle and the second part is body part that moves linearly relative to the first part during the dynamic condition.

39. The force limiting device according to claim 1, wherein the first part and the second part moving relative to one another are components of a linearly operating vehicle safety system comprising a fitting piece, which holds a belt and moves linearly relative to a first component fixed to the vehicle and motion of which enables a limited extraction of the belt.

40. The force limiting device according to claim 39, wherein the first part is fixed to the vehicle and includes a cylinder and that the second part is a fitting piece moving relative thereto and has a tube that can move in the cylinder, wherein the inside wall of the cylinder is provided with toothing and at least one pendulum mass, which is mounted so that it can swing in the tube up to a limit stop on the inside wall of the cylinder, is arranged in the tube and, with teeth that are disposed opposite one another, engages the toothing of the cylinder on its two end positions when the tube moves longitudinally relative to the inside wall of the cylinder, sliding of the tooth flanks of the teeth on the pendulum mass with tooth flanks of the inner toothing of the cylinder generates oscillation of the pendulum mass in such a manner that the motion of the tube is controlled with a feed rate defined by frequency of the swinging movement.

41. The force limiting device according to claim 40, wherein a plurality of pendulum masses is arranged within the tube with swinging movements rotating opposite to one another.

42. The force limiting device according to claim 40, wherein the tube in the cylinder is prestressed by a spring when in its starting position.

43. The force-limiting device of claim 1, further comprising a spring acting on the mass system.

\* \* \* \* \*

UNITED STATES PATENT AND TRADEMARK OFFICE
CERTIFICATE OF CORRECTION

PATENT NO.       : 8,473,162 B2                                              Page 1 of 1
APPLICATION NO.  : 11/911275
DATED            : June 25, 2013
INVENTOR(S)      : Ronald Jabusch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1366 days.

Signed and Sealed this
Eighth Day of September, 2015

Michelle K. Lee
*Director of the United States Patent and Trademark Office*